US007575353B2

(12) United States Patent
Oyama

(10) Patent No.: US 7,575,353 B2
(45) Date of Patent: Aug. 18, 2009

(54) DRUM-TYPE MOVABLE LIGHT SHIELDING PLATE AND LIGHTING DEVICE USING THE SAME

(75) Inventor: Hiroo Oyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 167 days.

(21) Appl. No.: 11/686,511

(22) Filed: Mar. 15, 2007

(65) Prior Publication Data

US 2007/0217214 A1 Sep. 20, 2007

(30) Foreign Application Priority Data

Mar. 15, 2006 (JP) ............................ 2006-071242

(51) Int. Cl.
*B60Q 1/12* (2006.01)
*F21V 13/12* (2006.01)
*F21V 17/02* (2006.01)

(52) U.S. Cl. ...................................... 362/539; 362/538

(58) Field of Classification Search ................. 362/538, 362/539

See application file for complete search history.

(56) References Cited

U.S. PATENT DOCUMENTS 5,673,990 A * 10/1997 Neumann et al. ........... 362/513
6,796,696 B2 * 9/2004 Taniuchi ..................... 362/539
7,008,094 B2 * 3/2006 Taniuchi ..................... 362/539
7,090,385 B2 8/2006 Sugimoto
7,165,872 B2 * 1/2007 Suzuki et al. ............... 362/538

FOREIGN PATENT DOCUMENTS

JP 2004349120 12/2004

* cited by examiner

*Primary Examiner*—Stephen F Husar
*Assistant Examiner*—James W Cranson
(74) *Attorney, Agent, or Firm*—Cermak Kenealy Vaidya & Nakajima LLP

(57) ABSTRACT

A lighting device can include a light shielding plate configured to impart a required or desired light distribution pattern by shielding light received directly from a light source and/or light reflected from a reflector. The light shielding plate can be configured to be movable between at least two predetermined positions so as to impart at least two light distribution patterns to the projected light. The movement of the light shielding plate can be achieved by rotation about a vertical rotary shaft.

14 Claims, 6 Drawing Sheets

DRUM-TYPE MOVABLE LIGHT SHIELDING PLATE AND LIGHTING DEVICE USING THE SAME

This application claims the priority benefit under 35 U.S.C. § 119 of Japanese Patent Application No. 2006-71242 filed on Mar. 15, 2006, which is hereby incorporated in its entirety by reference.

BACKGROUND

1. Field

The disclosed subject matter relates to a projector-type lighting device such as a headlight for a vehicle, and in particular, relates to a headlight which can provide a plurality of light distribution patterns including a passing-by light distribution pattern (or a low-beam light distribution), a traveling light distribution pattern (or a high-beam light distribution), and the like.

2. Brief Description of the Related Art

FIG. 1 shows a conventional projector-type headlight 90 which can selectively provide a low-beam light distribution pattern and a high-beam light distribution pattern. The projector-type headlight 90 has a lighting body 91, an ellipsoidal reflector 95, and a horizontal shaft 92 which is located near the second focus F2 of the ellipsoidal reflector 95 and extends in the widthwise direction of the vehicle. Light shielding plates 93L and 93R are attached to the horizontal shaft 92.

The light shielding plate 93L projects from the horizontal shaft 92 to an appropriate extent so as to form a low-beam light distribution pattern for the keep-to-the-left traffic system, and for emitting appropriate upward light beams to the left side. The light shielding plate 93R also projects from the horizontal shaft 92 to an appropriate extent so as to form a low-beam light distribution pattern for the keep-to-the-right traffic system, and for emitting appropriate upward light beams to the right side.

In this instance, both the light shielding plates 93L and 93R are located without interfering with the light reflected from the upper half 95U of the ellipsoidal reflector 95. For example, when the light shielding plate 93L is inserted in the light path for the light reflected from the upper half 95U to form a required light distribution pattern, the other light shielding plate 93R is configured not to function.

Between the light shielding plates 93L and 93R, a recessed portion 94 is arranged for allowing a part of the light reflected from the lower half 95D of the ellipsoidal reflector 95 to pass therethrough.

When the horizontal shaft 92 thus configured is rotated by an appropriate driving means such as a stepping motor, for example, each of the light shielding plates 93L and 93R can be positioned at a corresponding position, thereby providing a required low-beam light distribution pattern. It should be noted that the reference numeral 96 in this figure denotes a projection lens for projecting light with a required light distribution pattern formed by the light shielding plate 93L or 93R. (See Japanese Patent Laid-Open Publication No. 2004-349120 and U.S. Pat. No. 7,090,385 the disclosure of which is hereby incorporated in its entirety by reference).

In recent years, vehicle headlights may be provided with a so-called town driving light distribution pattern including no upward light irrespective of the keep-to-the-left or right traffic system. This town driving light distribution pattern may be adopted to a vehicle with an AFS system which can change its headlight direction along with steering and possibly other operations.

When each of the light shielding plates 93L and 93R of the projector-type headlight 90 is set to be located at a predetermined position, the specified corresponding light distribution pattern can be obtained. However, the headlight 90 with this configuration has the rotated horizontal shaft 92 arranged perpendicularly to the illumination direction. Therefore, when the positional relationship between the light shielding plates 93L and 93R is changed to switch the light distribution pattern, the transition light distribution pattern is significantly varied instantaneously and for a period of time (for example, for approximately 0.3 seconds). That is, during the switching operation, part of light is incident on, for example, the horizontal shaft 92 and is reflected and directed in unexpected directions. This reflected light may be emitted through the projection lens 96 to the outside.

In this case, the transition light distribution pattern is undesirably varied from the required light distribution pattern in accordance with its specification although the light is emitted for a short period of time. This light may become glaring light that is incident on opposing vehicles, pedestrians, etc. Therefore, this transition light distribution pattern should be improved. In particular, there is a long felt need for this problem to be solved in view of the increasing number of vehicles adopting AFS systems.

SUMMARY

In view of the above-described and other issues and problems, the disclosed subject matter has been developed. According to an aspect of the disclosed subject matter, a lighting device can include a light shielding plate which can provide a plurality of light distribution patterns while a transition light distribution pattern is created that is not undesirably varied.

According to another aspect of the presently disclosed subject matter, a light shielding plate can be provided that is configured to impart a required or desired light distribution pattern by shielding light received directly from a light source and/or light reflected from a reflector in an illumination direction. The light shielding plate can include a vertical rotary shaft portion and a light shielding portion, wherein the light shielding portion is composed of light shielding parts continuously formed and arranged in a horizontal direction for imparting at least two light distribution patterns to the projected light. The light shielding portion can also be configured to be movable around the vertical rotary shaft portion between at least two predetermined positions so as to impart the at least two light distribution patterns to the projected light. The rotary shaft portion can be located further in the illumination direction with respect to the light shielding portion.

In this light shielding plate, the light shielding portion can include a reflecting part for reflecting light, which is blocked by the light shielding plate, in the illumination direction so as to form a light distribution pattern.

The light shielding plate can further include a projection lens which is integrally provided and movable. Light with the required or desired light distribution pattern can be projected in an illumination direction of the projection lens by rotation of the light shielding plate.

Another aspect of the presently disclosed subject matter is a lighting device which can include: a light source; a reflector configured to reflect light from the light source in an illumination direction; a light shielding plate configured to impart a required or desired light distribution pattern by shielding light received directly from the light source and/or light reflected from the reflector in the illumination direction, the light shielding plate including a vertical rotary shaft portion and a light shielding portion, wherein the light shielding portion is composed of light shielding parts that are continuously formed and arranged in a horizontal direction and are configured to impart at least two light distribution patterns to the projected light, the light shielding portion being configured to be movable around the vertical rotary shaft portion between at least two predetermined positions so as to impart the at least two light distribution patterns to the projected light; and a projection lens. In this lighting device, the rotary shaft portion can be located further in the illumination direction with respect to the light shielding portion and in the vicinity of the projection lens.

In this lighting device, the light shielding portion can include a reflecting part for reflecting light, which is blocked by the light shielding plate, in the illumination direction to be used to form the light distribution pattern.

In this lighting device, the projection lens and the light shielding plate can be integrally provided and movable, and the light with the required or desired light distribution pattern can be projected in an illumination direction of the projection lens by the rotation of the light shielding plate.

Still another aspect of the presently disclosed subject matter is a vehicle lighting device which can include: a light source; a reflector located behind the light source, configured to reflect light from the light source in an illumination direction; a projection lens located in front of the light source, configured to project light received directly from the light source and/or light reflected by the reflector in the illumination direction; and a light shielding plate configured to impart a required or desired light distribution pattern on the projected light by shielding the light that is received directly from the light source and/or the light that is reflected from the reflector in the illumination direction, the light shielding plate including a vertical rotary shaft portion and a light shielding portion, wherein the light shielding portion is composed of light shielding parts that are continuously formed and arranged in a horizontal direction for imparting at least two light distribution patterns to the projected light, the light shielding portion being configured to be movable around the vertical rotary shaft portion between at least two predetermined positions so as to impart the at least two light distribution patterns to the projected light, and the rotary shaft portion being located further in the illumination direction with respect to the light shielding portion and in the vicinity of the projection lens.

In this vehicle lighting device, the reflector can be an ellipsoidal reflector having a first focus and a second focus, the light source can be located substantially at the first focus, and the light shielding portion can be located substantially at both the second focus and a focus of the projection lens.

In this vehicle lighting device, the light shielding portion can include a reflecting part for reflecting light, which is blocked by the light shielding plate, in the illumination direction to be used to form the light distribution pattern.

In this vehicle lighting device, the projection lens and the light shielding plate can be integrally formed and movable, and wherein light with the required or desired light distribution pattern can be projected in the illumination direction of the projection lens by the rotation of the light shielding plate.

In accordance with the presently disclosed subject matter, the movable light shielding plate is rotated around a shaft extending in a vertical direction, not in the horizontal direction like that in the conventional system. This can prevent the transition light distribution pattern, for example, the pattern of transition between a low-beam light distribution pattern to a high-beam light distribution pattern, from being abruptly varied and from forming an undesired light distribution pattern.

BRIEF DESCRIPTION OF THE DRAWINGS

These and other characteristics, features, and advantages of the disclosed subject matter will become clear from the following description with reference to the accompanying drawings, wherein.

DESCRIPTION OF EXEMPLARY EMBODIMENTS

Figure 1:
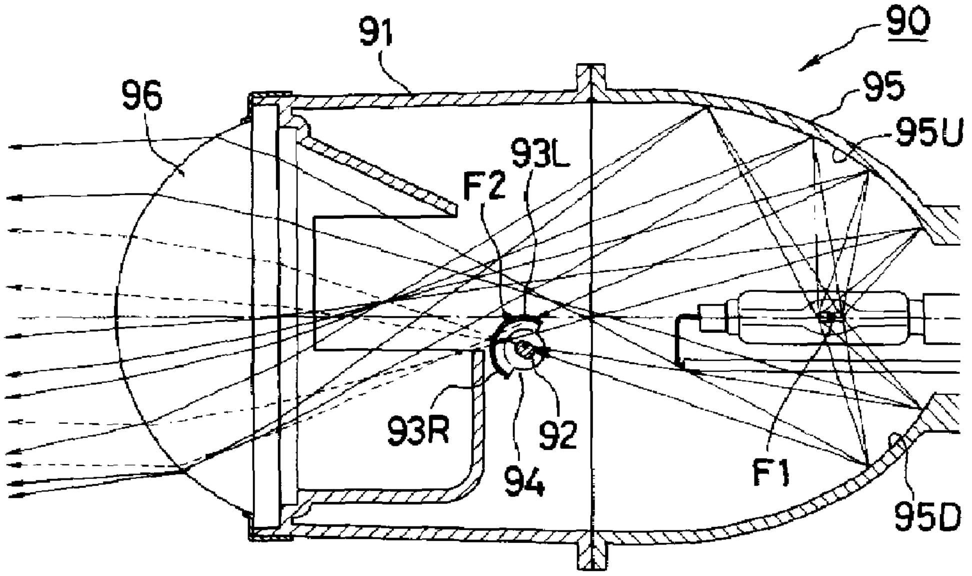
Fig. 1 PRIOR ART
FIG. 1 is a cross sectional view of a conventional exemplary lighting device configured as a headlight.
Figure 2:
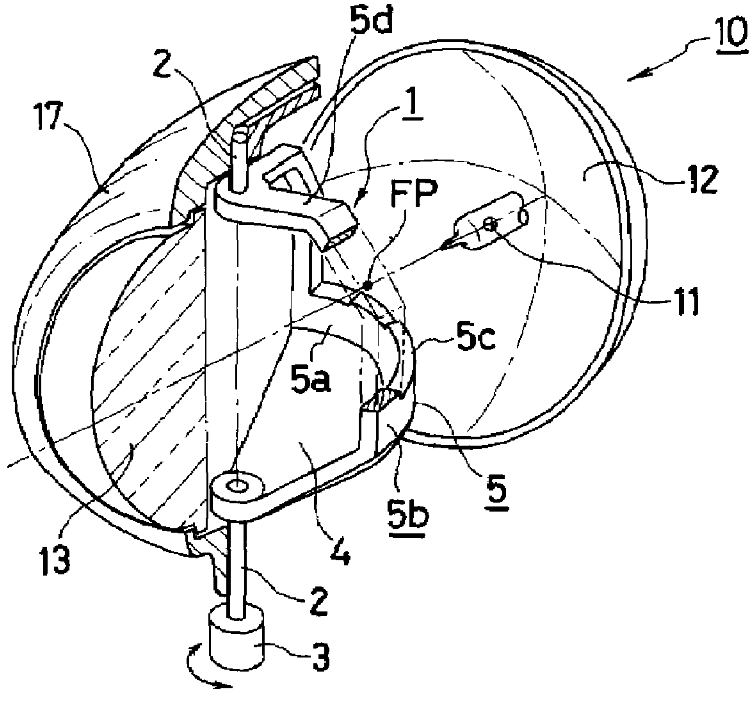
FIG. 2 is a perspective view showing one exemplary embodiment of a lighting device made in accordance with principles of the presently disclosed subject matter.

A description will now be given of exemplary embodiments in accordance with the presently disclosed subject matter with reference to the accompanying drawings. FIG. 2 shows one exemplary embodiment of a projector-type headlight 10 having a drum-type movable light shielding plate 1 made in accordance with the presently disclosed subject matter. The headlight 10 is mainly composed of a light source 11, an ellipsoidal reflector 12 having a first focus and a second focus, a movable light shielding plate 1, and a projector lens 13 having a focus substantially at the light shielding plate 1. In this instance, the light source 11 is located substantially at the first focus of the reflector.

In the above described configuration according to the disclosed subject matter, the drum type movable light shielding plate 1 may have a pair of upper and lower rotary shafts 2 (i.e., a rotary shaft portion). The pair of rotary shafts 2 is connected to a frame part 5*d* at respective positions where the light shielding plate 1 can properly function. Both of the rotary shafts 2 can move simultaneously. The projector-type headlight 10 can include a lens holder 17 which can hold the projection lens 13 and to which the rotary shafts 2 can be mounted so that they can rotate about a substantially vertical axis. Note that a driving mechanism including an appropriate driving device 3 such as a stepping motor can be connected to any one of the upper and lower rotary shafts 2 so as to rotate the rotary shaft 2 through a desired angle.

The light shielding plate 1 can have an extended portion 4 and a light shielding portion 5. The extended portion 4 can extend from the location where the rotary shaft 2 is provided to the focus FP of the projection lens 13. The light shielding portion 5 is continued from the extended portion 4 and is composed of light shielding parts 5*a* and 5*b* having a step 5*c* for forming an appropriate light distribution pattern such as a low beam light distribution pattern. In this instance, the light shielding portion 5 can be formed along a circumferential direction. It should be appreciated that the rotary shafts 2 may be located near the projector lens 13 in order to properly carry out the operation described above. Also in this case, this configuration allows the light shielding portion 5 to move across a relatively wide area.

The light shielding parts 5*a* and 5*b* can be continuously formed along the rotation direction such that the light shielding part 5*a* forms a light distribution pattern for the keep-to-the-left traffic and the light shielding part 5*b* includes a bored portion to form a high-beam light distribution pattern. The rotary shafts 2 can rotate in a predetermined range in the horizontal direction. The rotary shafts 2 can be rotated by the driving device 3 in order to adjust the light shielding part 5*a* for the keep-to-the-left traffic system to a position substantially at the focus of the projection lens 13 when driving in the town driving mode. This configuration can form a low-beam light distribution pattern for the keep-to-the-left traffic system chosen by a user to emit light with this pattern through the projection lens 13. When driving in a normal mode, the rotary shafts 2 are rotated by the driving device 3 in order to locate the light shielding part 5*b* for the high-beam light distribution pattern at a position substantially at the focus of the projection lens 13. Accordingly, light with a high-beam light distribution pattern can be projected toward the front of the vehicle body and in an illumination direction.

A description will now be given of a switching operation between light distribution patterns formed by the drum-type movable light shielding plate 1 in accordance with the disclosed subject matter. When the light shielding part 5*a* for the keep-to-the-left traffic system is switched to the light shielding part 5*b* for the high-beam light distribution pattern, the continuous step 5*c* is moved by the rotation of the rotary shafts 2. Accordingly, light other than the light shaped by the light shielding parts 5*a* and 5*b* is not emitted during the switching operation. Namely, one of the light shielding parts 5*a* and 5*b* is moved from the right side or left side to smoothly change another light distribution pattern. This natural change does not provide any sense of incongruity to a viewer.

In the above-described exemplary embodiment, the drum-type movable light shielding plate 1 is provided with the light shielding part 5*a* that is configured to form a light distribution pattern suitable for the keep-to-the-left traffic system, and the light shielding part 5*b* configured to form a high-beam light distribution pattern. However, the disclosed subject matter is not limited thereto. In one alternative exemplary embodiment, the movable light shielding plate 1 may have a light shielding part configured to form a town driving light distribution pattern which is suitable for AFS systems and does not include upward light. In still another alternative exemplary embodiment, the movable light shielding plate 1 may have another light shielding part which can form a light distribution pattern with increased upward light as compared to the light shielding part 5*a*. Accordingly, the movable light shielding plate made in accordance with the principles of the presently disclosed subject matter can be designed based on various desired specifications.

Figure 3:
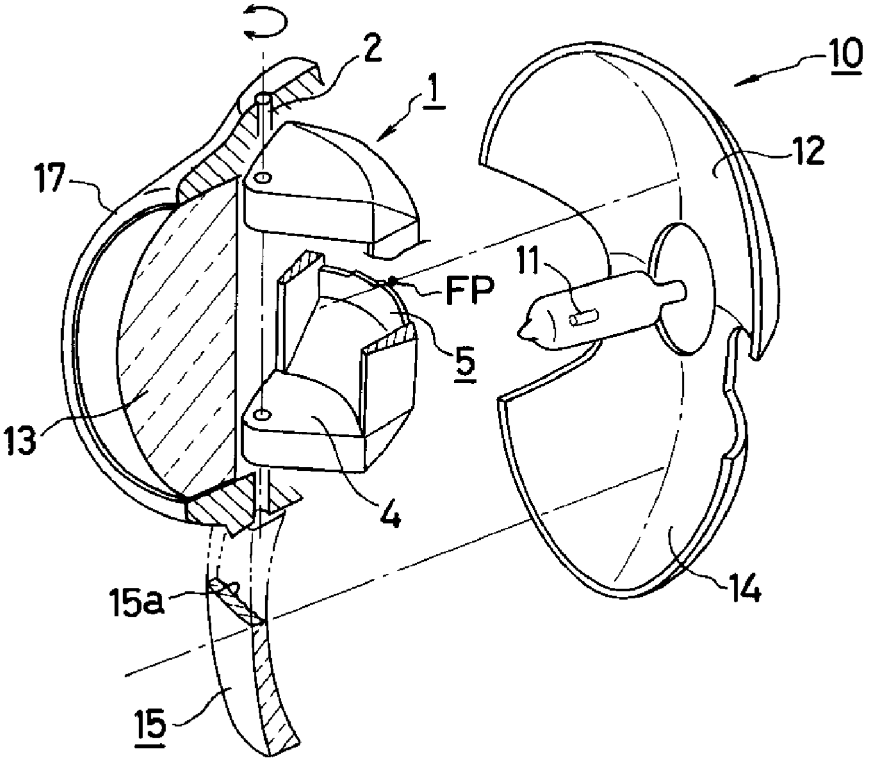
FIG. 3 is a partially cut-away diagram showing another exemplary embodiment of a lighting device made in accordance with principles of the presently disclosed subject matter.

In the previous exemplary embodiment, the ellipsoidal reflector 12 having a circular shape is arranged behind the light source 11 so that the light source 11 is located substantially at a first focus of the ellipsoidal reflector. When a low-beam light distribution pattern is formed, the light reflected by the lower half of the ellipsoidal reflector 12 may be shielded by the movable light shielding plate 5. Accordingly, the light utilization efficiency may deteriorate. Taking this fact into consideration, another exemplary embodiment in accordance with the disclosed subject matter can be provided as shown in FIG. 3.

The headlight 10 of the exemplary embodiment shown in FIG. 3 has a second reflector 14 located below the ellipsoidal reflector 12 (below the light source 11). The second reflector 14 can be composed of a parabolic reflecting surface or a free-curved reflecting surface with its focus being at or near the light source. In this instance, a second lens 15 with a corrugated lens cut 15*a* formed thereon can be provided below the projection lens 13. In this configuration, the light reflected by the second reflector 14 is not incident on the projection lens 13, but passes beneath the light shielding plate 1 and is incident on the second lens 15 below the projection lens 13 to be diffused in the horizontal direction. Therefore, the light distribution pattern formed by the light emitted from the projection lens 13 can be supplemented with the light emitted from the second lens 15. It should be appreciated that the present exemplary embodiment is not limited thereto and a specified area of the light distribution pattern, such as a central area, can be supplemented with the light from the second lens 15.

Figure 4:
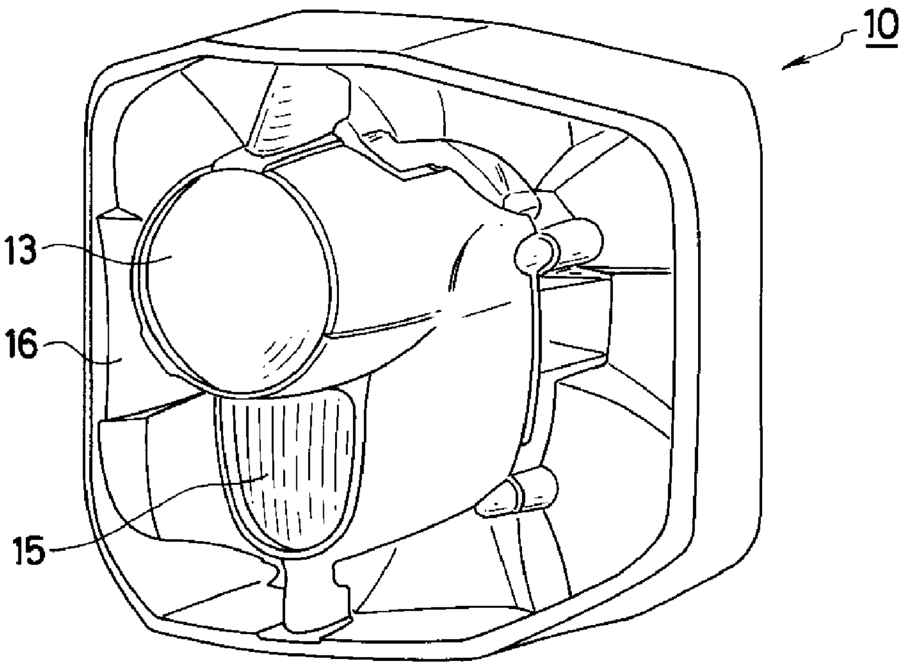
FIG. 4 is a perspective view showing still another exemplary embodiment of a lighting device made in accordance with principles of the presently disclosed subject matter.

In some cases, part of the light from the light source cannot reach the reflector 12 and/or the second reflector 14. In view of this, another exemplary embodiment as shown in FIG. 4 can include an auxiliary reflector 16 in order to cover such areas, thereby improving the light utilization efficiency.

Figure 5:
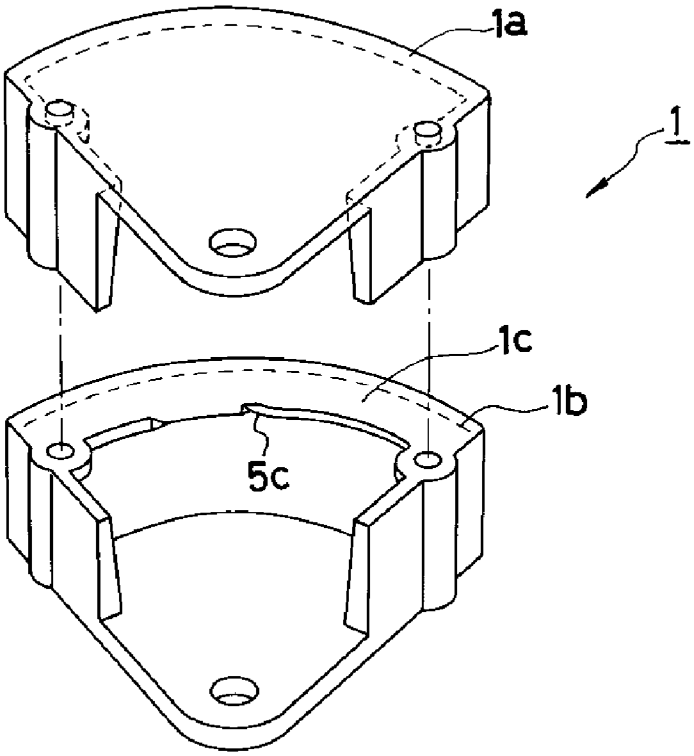
FIG. 5 is a diagram illustrating a disassembled drum-type movable light shielding plate made in accordance with principles of the presently disclosed subject matter.

FIG. 5 shows a variation of the exemplary embodiment of the drum-type movable light shielding plate 1. The light shielding plate 1 of this exemplary embodiment is composed of an upper half part 1*a* and a lower half part 1*b*. The lower half part 1*b* has a flat face 1*c* for partitioning the upper and the lower half parts 1*a* and 1*b*. These half parts 1*a* and 1*b* are integrated by a screw to complete the drum-type movable light shielding plate 1. The flat face 1*c* may have a certain width and may be configured to horizontally protrude when the upper and lower half parts 1*a* and 1*b* are integrated. It should be appreciated that a step 5*c* for forming an appropriate light distribution pattern is provided at the peripheral area of the flat face 1*c* near the projection lens 13. Therefore, rotation of the drum-type movable light shielding plate 1 can provide a desired light distribution pattern.

A description will now be given of a case where the movable light shielding plate 1 of this variation is applied to the headlight as shown in FIG. 3. In this case, the ellipsoidal reflector 12 is located above the movable light shielding plate 1. Accordingly, almost all the light reflected by the reflector 12 can pass above the flat face 1*c* as shown in FIG. 5 and be directed to the focus FP of the projection lens 13, the focus being located near the step 5*c* of the surface properties.

As compared to a conventional light shielding plate with a vertical plate shape, the light reaching the upper side of the flat face 1*c* is not shielded, but reflected by the flat face 1*c* to be incident on the projection lens 13. The position, length, and other factors of the flat face 1*c* can be appropriately set to increase the light amount without deterioration of the light distribution pattern by the light shielding plate 1. FIGS. 6 through 10 show still another exemplary embodiment of a projector-type headlight 10 in accordance with the disclosed subject matter. In this exemplary embodiment, the drum-type movable light shielding plate 1 is designed to mainly form a low-beam light distribution pattern which is utilized in 90% of night driving in recent years.

Typical projector-type headlights have a revolved ellipsoid reflector, a light source located substantially at the first focus of the reflector, and a projection lens located substantially at the second focus of the reflector, for example.

In this configuration, a high-beam light distribution pattern can be obtained with light that is spread vertically and horizontally at suitable angular ranges. This high-beam light distribution pattern is partly shielded to obtain a low-beam light distribution pattern. For example, the light reflected by the lower half of the ellipsoid reflector can be shielded by a light shielding plate to prevent the upward light from being emitted through the projection lens and to thus form the low-beam light distribution pattern.

Accordingly, the light amount of the low-beam light distribution pattern is less than that of the high-beam light distribution pattern. In view of the above-mentioned circumstance where the low-beam light distribution pattern is mainly utilized in night driving, it is desired to improve the light utilization efficiency.

Figure 6:
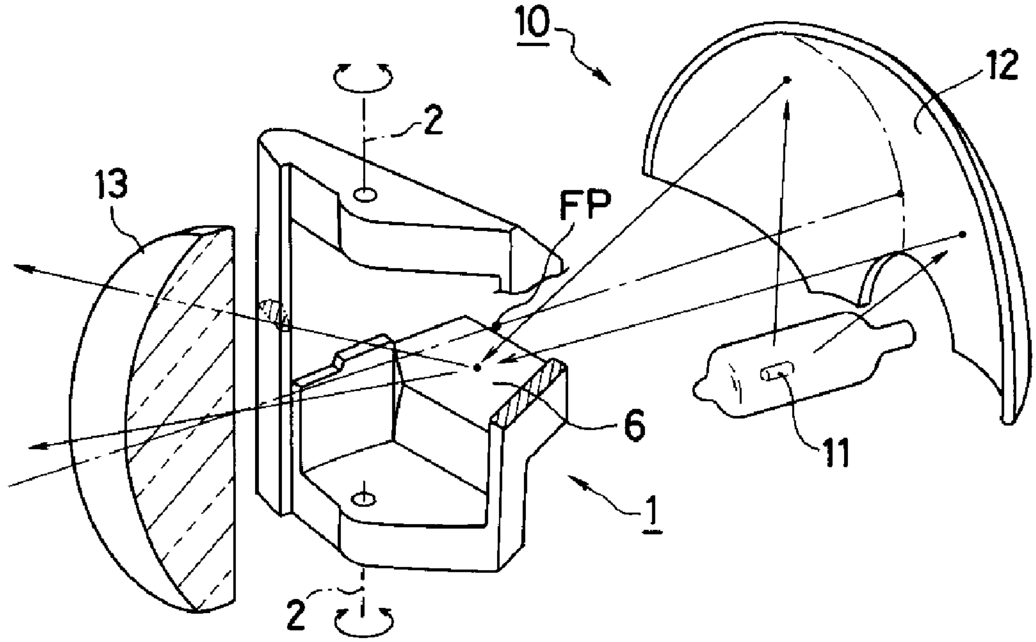
FIG. 6 is a diagram illustrating still another exemplary embodiment of a lighting device made in accordance with principles of the presently disclosed subject matter.

The present exemplary embodiment is designed while taking this desire into consideration. The drum-type movable light shielding plate 1 of the exemplary embodiment of FIG. 6 is attached near the projection lens 13 using the rotary shafts 2. As shown, the light shielding plate 1 can be rotated and moved between the low-beam light distribution pattern formation position of FIG. 7 and the high-beam light distribution pattern formation position of FIG. 8. The light shielding plate 1 is provided with a light shielding part 51 for forming the low-beam light distribution pattern. When the light shielding plate 1 is located at the low-beam light distribution pattern formation position of FIG. 7, the light shielding part 51 is located at a predefined position.

Figure 7:
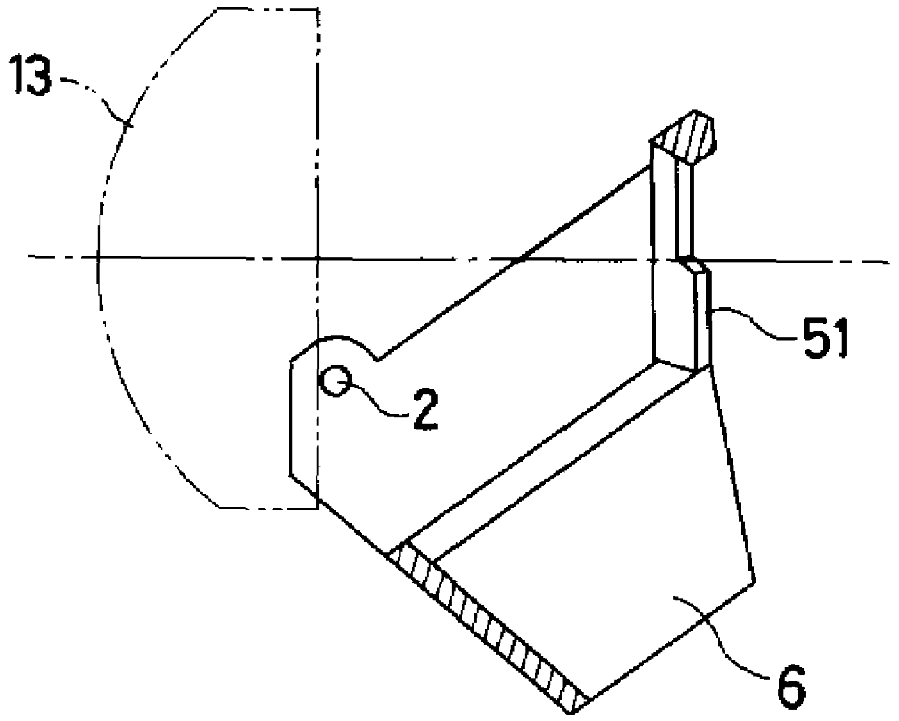
FIG. 7 is a diagram illustrating the arrangement of the drum-type movable light shielding plate of the exemplary embodiment of FIG. 6, for providing a high-beam light distribution pattern.

In the exemplary embodiment as shown in FIG. 7, the light shielding part 51, light source 11, ellipsoidal reflector 12, projection lens 13, and other parts are optimized to form the low-beam light distribution pattern. Accordingly, the light amount of the low-beam light distribution pattern is maximized using the light shielding part 51 and other parts to obtain a brighter low-beam light distribution pattern.

Figure 8:
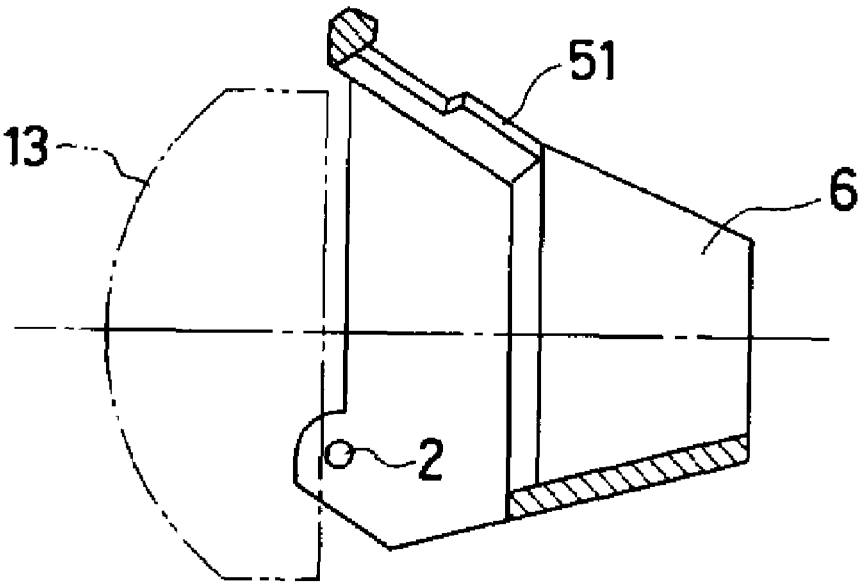
FIG. 8 is a diagram for illustrating the arrangement of the drum-type movable light shielding plate of the exemplary embodiment of FIG. 6, for providing a low-beam light distribution pattern.

FIG. 8 shows the drum-type movable light shielding plate 1 located at the high-beam light distribution pattern formation position. In this exemplary embodiment, the light shielding plate 1 has a reflector 6 for forming the high-beam light distribution pattern and is configured so that the reflector 6 is positioned substantially at the second focus of the ellipsoidal reflector 12. According to this configuration, the light from the light source 11 is incident on the reflector 6. Then, the light is reflected upward and enters the projection lens 13 to form the high-beam light distribution pattern.

Figure 9:
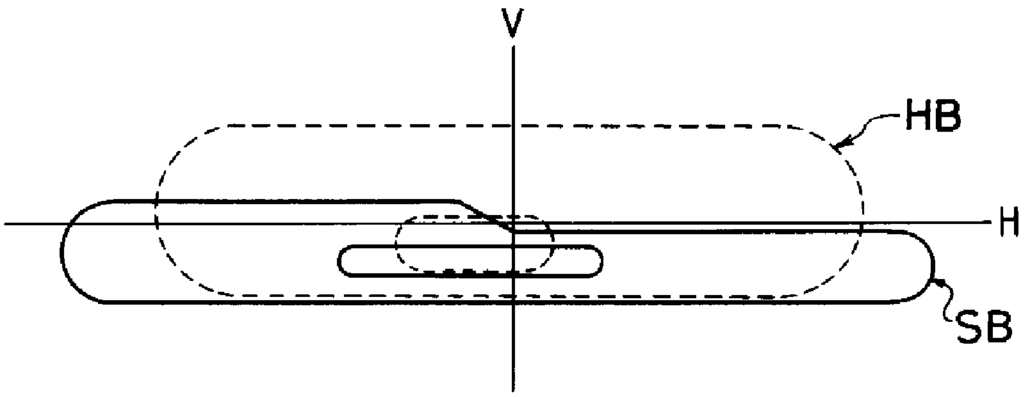
FIG. 9 is a graph showing a low-beam light distribution pattern and a high-beam light distribution pattern for the drum-type movable light shielding plate of the exemplary embodiment of FIG. 6.

As described above, the exemplary embodiment of FIG. 6 aims to improve the light utilization efficiency in the case where the drum-type movable light shielding plate 1 is positioned at the low-beam light distribution pattern formation position. Therefore, it is possible that there is no substantial difference in the light amount between the low-beam and high-beam light distribution patterns. Accordingly, as shown in FIG. 9, the light distribution pattern HB is spread in the vertical direction by the reflector 6 which forms a high-beam light distribution pattern. Conversely, the low-beam light distribution pattern SB which is utilized as a normal mode in night driving is optimized in terms of the light utilization efficiency. Therefore, the headlight can be brighter than conventional headlights to improve the visibility.

Figure 10:
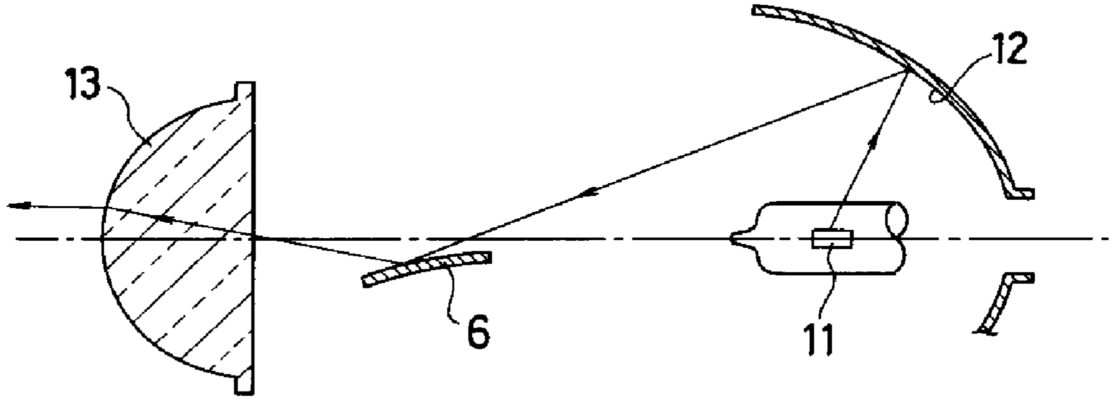
FIG. 10 is a diagram illustrating the function of the reflector for assisting the formation of the high-beam light distribution pattern by the drum-type movable light shielding plate of the exemplary embodiment of FIG. 6, for providing a high-beam light distribution pattern.

FIG. 10 shows another exemplary configuration of a headlight with a reflector 6 that is configured to form a high-beam light distribution pattern. In this case, the reflector 6 is formed as a flat face or a curved face inclined forward with respect to the projection lens 13. The reflector 6 can reflect the light reflected downward with an acute angle from the ellipsoidal reflector 12, thereby directing the light to travel substantially in the illumination direction. In this case, by adjusting the angle, radius of curvature, and other factors of the reflector, the light distribution pattern can be optimized.

Figure 11:
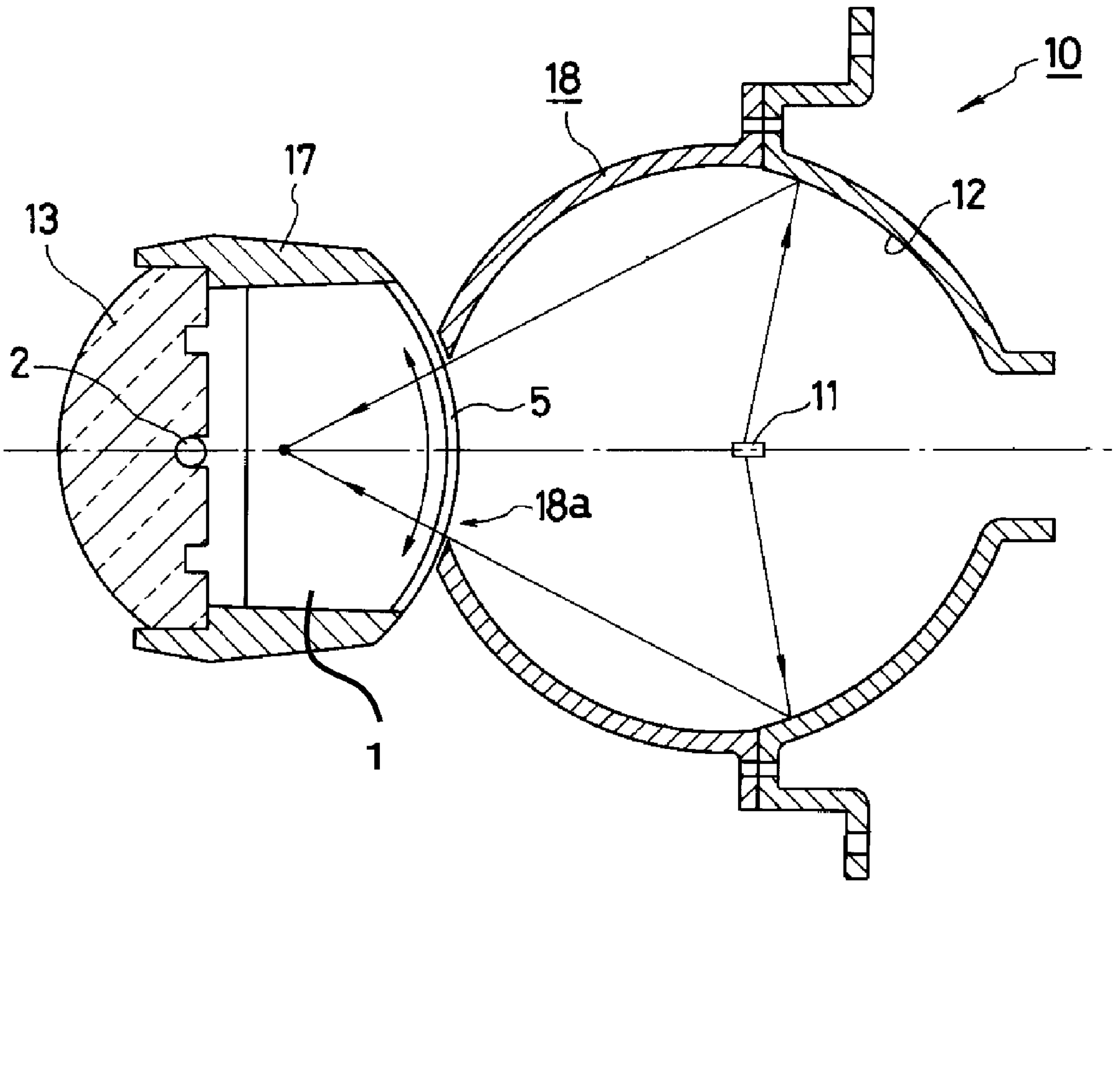
FIG. 11 is a cross sectional view illustrating still another exemplary embodiment of a lighting device made in accordance with principles of the presently disclosed subject matter.

The above-described exemplary embodiments of the headlight in accordance with the disclosed subject matter each include a light source 11, an ellipsoidal reflector 12, and a projection lens 13 all of which are fixed while the drum-type movable light shielding plate 1 is rotated to adjust the shape of the light distribution pattern. On the contrary, FIG. 11 shows an application example of a drum-type movable light shielding plate made in accordance with the disclosed subject matter. In this exemplary embodiment, the drum-type movable plate 1 can include a projection lens 13 and a lens holder 17 which are integrated together to rotate simultaneously. Furthermore, the headlight 10 can include a main body 18 with the ellipsoidal reflector 12. The main body 18 has an opening 18*a* for emitting light. The movable light shielding plate 1 including the lens holder 17 can be attached to the opening 18*a*. In this instance, the size of the movable light shielding plate 1 is large enough to cover the opening 18*a* so that, when the lens holder 17 is rotated at its maximum angle, substantially no light directly leaks out from the main body 18.

In the exemplary embodiment of FIG. 11, the projection lens 13 and the lens holder 17 can move integrally with the movable light shielding plate 1. Accordingly, the size of the main body opening 18*a* can be designed appropriately in consideration of the optical design of the main body 18 such as the ellipsoidal reflector 12 and other parts, so as not to generate irregular light distribution pattern(s) depending on the direction of the projection lens 13.

In the exemplary embodiment illustrated in FIG. 11, the rotary shafts 2 are arranged within the projection lens 13 area. Accordingly, the position of the projection lens 13 serves as a center of rotation, and the portion of the lens holder 17 being in contact with the main body and the movable light shielding plate 1 can rotate around the center. The sliding-contact portions of these components should be formed with high accuracy. This can prevent light from leaking directly from the main body.

In the present exemplary embodiment configured as described above, when the movable light shielding plate 1 is rotated, the projection lens 13 simultaneously follows the rotation. Therefore, light with a desired light distribution pattern can be irradiated towards the direction of the projection lens 13.

Consider a case where such a light is formed as a cornering light for an automobile. When the automobile travels straightforward, the cornering light can illuminate in a horizontal direction. In this configuration, for example, as the steering angle becomes large, it is possible to configure the cornering light so as to emit light with increased low-beam light distribution pattern characteristics. This configuration can improve the visibility in the traveling direction and does not provide glaring light to oncoming vehicles or to pedestrians, etc.

In the exemplary embodiment of FIG. 11, the main body 18 including the light source 11, ellipsoidal reflector 12, and other parts can be fixed to the vehicle body. The unit including the movable light shielding plate 1 (also including the projection lens 13 and the lens holder 17) can be driven to change the light distribution patterns and the illumination direction at the same time. Therefore, the lighting device provided with the above-described movable light shielding plate can be applied to a cornering light or to an AFS system which works with a steering system, thereby simplifying these systems.

Furthermore, in the exemplary embodiment of FIG. 11, when the light distribution pattern is changed from one pattern to another, the movable light shielding plate is moved along with the movement of the projection lens 13 to change its illumination direction. Therefore, when pedestrians see the lighting device, the appearance and movement thereof are like animate beings, which imparts a unique appearance to the vehicle. Furthermore, one can expect the next operation of the vehicle based on the movement of the lighting device. This facilitates communication between vehicles and pedestrians.

While there has been described what are at present considered to be exemplary embodiments of the invention, it will be understood that various modifications may be made thereto, and it is intended that the appended claims cover such modifications as fall within the true spirit and scope of the invention.

What is claimed is:

1. A light shielding plate for imparting a desired light distribution pattern to projected light by shielding light traveling in an illumination direction and received from at least one of a light source directly and a reflector, the light shielding plate comprising:

a vertical rotary shaft portion;

a light shielding portion, wherein the light shielding portion includes light shielding parts which are continuously formed, are arranged in a horizontal direction, and impart at least two light distribution patterns to the projected light, the light shielding portion movable about the vertical rotary shaft portion and between at least two predetermined positions so as to impart the at least two light distribution patterns to the projected light, and a projection lens which is integrally provided with the light shielding plate and movable with the light shielding plate, and wherein light with at least one of the at least two light distribution patterns is projected in an illumination direction of the projection lens by rotation of the light shielding plate, and wherein the rotary shaft portion is located further in the illumination direction as compared to the light shielding portion.

2. The light shielding plate according to claim 1, wherein the light shielding portion includes a reflecting part which reflects light, which is blocked by the light shielding plate, into the illumination direction to be used to form the desired light distribution pattern.

3. A lighting device comprising:

a light source;

a reflector which reflects light from the light source in an illumination direction;

a light shielding plate which imparts a desired light distribution pattern with projected light by shielding light received from at least one of the light source directly and the reflector, the light shielding plate including, a vertical rotary shaft portion, and a light shielding portion, wherein the light shielding portion includes light shielding parts which are continuously formed and are arranged in a horizontal direction for imparting at least two light distribution patterns with the projected light, the light shielding portion being movable about the vertical rotary shaft portion between at least two predetermined positions so as to impart the at least two light distribution patterns with the projected light; and a projection lens, wherein the rotary shaft portion is located further in the illumination direction as compared to the light shielding portion, and adjacent the projection lens and wherein the projection lens and the light shielding plate are integrally provided and movable with respect to at least one of the light source and reflector, and wherein light with at least one of the at least two light distribution patterns is projected in the illumination direction by rotation of the light shielding plate.

4. The lighting device according to claim 3, wherein the light shielding portion includes a reflecting part which reflects light, which is blocked by the light shielding plate, in the illumination direction to be used to form the desired light distribution pattern.

5. A vehicle lighting device comprising:

a light source;

a reflector located behind the light source, which reflects light from the light source in an illumination direction;

a projection lens located in front of the light source, which projects light received at least one of from the light source directly and from the reflector in the illumination direction; and a light shielding plate which imparts a desired light distribution pattern with the projected light by shielding the light received at least one of from the light source directly and from the reflector, the light shielding plate including, a vertical rotary shaft portion, and a light shielding portion, wherein the light shielding portion includes light shielding parts which are continuously formed and arranged in a horizontal direction for imparting at least two light distribution patterns with the projected light, the light shielding portion movable about the vertical rotary shaft portion and between at least two predetermined positions so as to impart the at least two light distribution patterns with the projected light, and wherein the projection lens and the light shielding plate are integrally provided and movable with respect to at least one of the light source and the reflector, and wherein light with at least one of the at least two light distribution patterns is projected in the illumination direction of the projection lens by rotation of the light shielding plate, and wherein the rotary shaft portion being located further in the illumination direction as compared to the light shielding portion, and adjacent the projection lens.

6. The vehicle lighting device according to claim 5, wherein the reflector is an ellipsoidal reflector having a first focus and a second focus, and the projection lens has a projection lens focus, the light source is located substantially at the first focus, and the light shielding portion is located substantially at the second focus and the projection lens focus.

7. The vehicle lighting device according to claim 5, wherein the light shielding portion includes a reflecting part which reflects light, which is blocked by the light shielding plate, into the illumination direction so as to form the desired light distribution pattern.

8. The vehicle lighting device according to claim 5, further comprising:

a second lens located below the projection lens.

9. The vehicle lighting device according to claim 5, further comprising:

an auxiliary reflector located adjacent the projection lens in a horizontal direction.

10. The vehicle lighting device according to claim 5, wherein the light shielding plate includes an upper half part and a lower half part, and the lower half part includes a flat face and a step.

11. The vehicle lighting device according to claim 5, wherein the rotary shaft portion is located between the projection lens and the light shielding portion.

12. The vehicle lighting device according to claim 5, wherein the light shielding plate is movable with respect to the projection lens, and wherein light with at least one of the at least two light distribution patterns is projected in the illumination direction of the projection lens by rotation of the light shielding portion from a first of the at least two predetermined positions to a second of the at least two predetermined positions.

13. The vehicle lighting device according to claim 5, wherein the at least two light distribution patterns includes a first light distribution pattern and a second light distribution pattern that is different from the first light distribution pattern, and the light shielding parts includes a first light shielding part which imparts the first light distribution pattern with the projected light, and a second light shielding part configured to impart the second light distribution pattern with the projected light.

14. The vehicle lighting device according to claim 13, wherein moving the light shielding portion about the vertical rotary shaft portion causes the first light shielding part to move away from a focus of the projection lens and the second light shielding part to move towards the focus of the projection lens.

* * * * *